(12) United States Patent
Shimotaya et al.

(10) Patent No.: US 12,061,804 B2
(45) Date of Patent: Aug. 13, 2024

(54) STORAGE SYSTEM AND DATA PROCESSING METHOD

(71) Applicant: Hitachi, Ltd., Tokyo (JP)

(72) Inventors: Suguru Shimotaya, Tokyo (JP);
Takafumi Maruyama, Tokyo (JP);
Akihiro Shikano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/687,760

(22) Filed: Mar. 7, 2022

(65) Prior Publication Data

US 2023/0168817 A1 Jun. 1, 2023

(30) Foreign Application Priority Data

Dec. 1, 2021 (JP) ................. 2021-195584

(51) Int. Cl.
*G06F 12/00* (2006.01)
*G06F 3/06* (2006.01)

(52) U.S. Cl.
CPC .......... *G06F 3/0623* (2013.01); *G06F 3/0656* (2013.01); *G06F 3/0659* (2013.01); *G06F 3/0683* (2013.01)

(58) Field of Classification Search
CPC ..... G06F 3/0623; G06F 3/0659; G06F 3/0683
USPC ........................................ 711/163
See application file for complete search history.

(56) References Cited

U.S. PATENT DOCUMENTS

| | | | |
|---|---|---|---|
| 6,564,304 B1 * | 5/2003 | Van Hook ........... | G06F 13/1626 710/39 |
| 9,588,840 B2 * | 3/2017 | Chung ................ | G06F 11/1048 |
| 10,445,176 B2 * | 10/2019 | Lee ..................... | G06F 11/1048 |
| 2005/0273566 A1 * | 12/2005 | Murayama .......... | G06F 13/1694 711/170 |
| 2008/0114922 A1 * | 5/2008 | Chou ....................... | H04N 1/44 711/E12.1 |
| 2008/0229118 A1 | 9/2008 | Kasako et al. | |
| 2009/0015591 A1 * | 1/2009 | Tanaka ................... | G09G 5/399 345/547 |

(Continued)

FOREIGN PATENT DOCUMENTS

| | | |
|---|---|---|
| JP | 2008-234052 A | 10/2008 |
| JP | 2021-140342 A | 9/2021 |

OTHER PUBLICATIONS

Japanese Office Action received in corresponding Japanese Application No. 2021-195584 dated Oct. 31, 2023.

*Primary Examiner* — Mohamed M Gebril
(74) *Attorney, Agent, or Firm* — MATTINGLY & MALUR, PC

(57) ABSTRACT

A storage system in which a controller has an encryption-related function is provided. There is provided a storage system including an interface section coupled to one or more storages and a controller that carries out reading and writing processes on the storages via the interface section. The controller includes an arithmetic processing section, a memory, and an encryption processing section. The arithmetic processing section causes the memory to hold data before processing and data after processing by the encryption processing section, and limits the access destination from the storages to the memory. The configuration and actions described above allow the storage system to avoid occurrence of deadlock and the controller to have an encryption-related function.

4 Claims, 12 Drawing Sheets

(56) References Cited

U.S. PATENT DOCUMENTS

| | | | |
|---|---|---|---|
| 2009/0100206 A1* | 4/2009 | Wang | G06F 13/1673 |
| | | | 710/112 |
| 2010/0031063 A1* | 2/2010 | Fascenda | H04L 9/0894 |
| | | | 713/193 |
| 2010/0174955 A1* | 7/2010 | Carnevale | G11C 29/16 |
| | | | 714/E11.169 |
| 2012/0239873 A1* | 9/2012 | Huang | G06F 13/1626 |
| | | | 711/E12.001 |
| 2014/0258608 A1* | 9/2014 | Viswanatha | G06F 11/00 |
| | | | 711/113 |
| 2014/0317470 A1* | 10/2014 | Chung | G06F 11/1048 |
| | | | 714/764 |
| 2016/0019145 A1* | 1/2016 | Mimata | G06F 12/0868 |
| | | | 711/119 |
| 2016/0282831 A1* | 9/2016 | Kellers | G06F 11/3024 |
| 2018/0293133 A1* | 10/2018 | Lee | G06F 11/1048 |
| 2018/0349060 A1* | 12/2018 | Ochiai | G06F 3/0673 |
| 2019/0339906 A1* | 11/2019 | Murayama | G06F 13/1668 |
| 2020/0135291 A1* | 4/2020 | Takahashi | G11C 8/12 |
| 2021/0279371 A1* | 9/2021 | Monji | G06F 21/602 |

\* cited by examiner

STORAGE SYSTEM AND DATA PROCESSING METHOD

CROSS-REFERENCE TO RELATED APPLICATION

The present application claims priority from Japanese application JP 2021-195584, filed on Dec. 1, 2021, the contents of which is hereby incorporated by reference into this application.

BACKGROUND OF THE INVENTION

Field of the Invention

The present invention relates to a storage system and a data processing method.

Description of the Related Art

There is a known configuration of related art in which a storage system has an encryption function. For example, Japanese Patent Laid-Open No. 2021-140342 describes that "A storage system 110 includes a plurality of (or one) SSDs 111, an FE-IF (front-end interface apparatus) 121, to which a host system 101 is coupled, an encryption apparatus 128, to which the plurality of SSDs 111 are coupled, and a storage controller 112 coupled to the FE-IF 121 and the encryption apparatus 128. The encryption apparatus 128 includes a PCIe-SW 122, to which the plurality of (or one) SSDs 111 are coupled, and an encryption module 150 coupled to the PCIe-SW 122. The storage controller 112 includes a primary storage memory 123 and a CPU 124."

In the related art described above, the back-end interface has an encryption-related function. It is, however, desired that the controller have the encryption-related function from the viewpoint, for example, of suppression of power consumption.

To allow the controller to have the encryption-related function, it is necessary to solve a data management problem. For example, a configuration in which data before and after encrypted are held at different locations in the controller and the storages can access both locations is likely to cause deadlock. It is further required to suppress the capacity of the memory that holds the data in the controller.

In view of the circumstances described above, an object of the present invention is to solve the data management problem and provide a storage system in which a controller has an encryption-related function.

SUMMARY OF THE INVENTION

To achieve the object described above, a representative storage system according to the present invention includes an interface section coupled to one or more storages and a controller that carries out reading and writing processes on the storages via the interface section. The controller includes an arithmetic processing section, a memory, and an encryption processing section. The arithmetic processing section causes the memory to hold data before processing and data after processing by the encryption processing section, and limits an access destination from the storages to the memory.

A representative data processing method according to the present invention is a data processing method executed by a controller coupled to a storage via an interface section. The method includes a step in which an arithmetic processing section provided in the controller stores data to be processed by an encryption processing section provided in the controller in a memory provided in the controller, a step in which the arithmetic processing section causes the encryption processing section to process the data to be processed, and a step of holding the data after processing by the encryption processing section in the memory, and the storage accesses the memory both when the data to be processed is written onto the storage and when the data after processing is read from the storage.

According to the present invention, a storage system in which the controller has an encryption-related function can be provided. Objects, configurations, and effects other than those described above will be apparent from the following description of an embodiment.

DETAILED DESCRIPTION OF THE PREFERRED EMBODIMENTS

Figure 1:
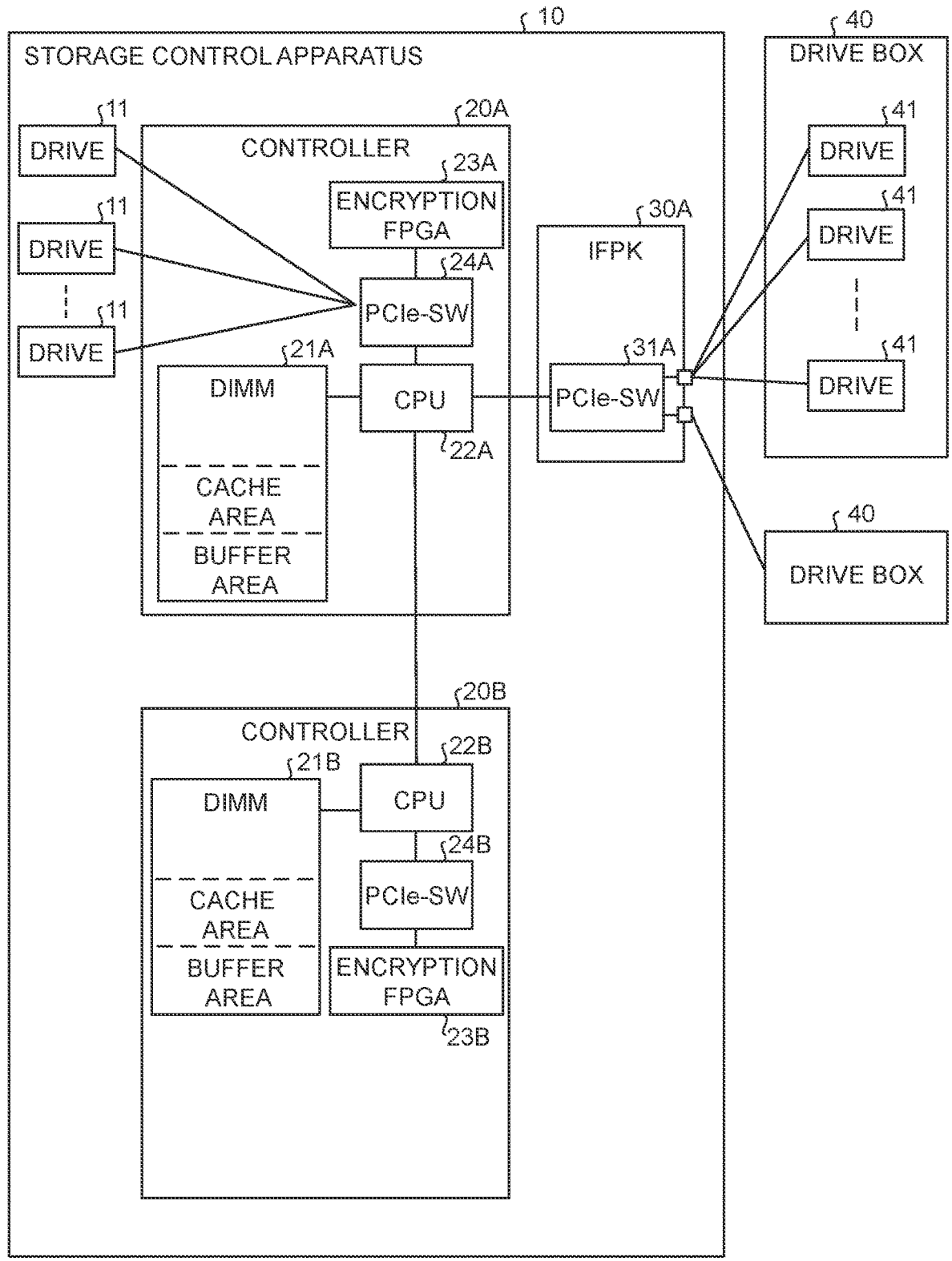
FIG. 1 shows the configuration of a storage system according to an example.

An embodiment according to the present invention will be described below with reference to the drawings. It should be noted that the embodiment described below does not limit the invention according to the claims, and that all the elements and combinations thereof described in the embodiment are not necessarily essential to achieve the invention. Furthermore, configurations that are essential for the configuration of the invention but are well known are not illustrated or described in some cases.

In the following description, expression such as a "table xxx" is used in some cases to describe information that allows an input to provide an output, and the information may be data having any structure. The "table xxx" can therefore be referred to as "information xxx".

In the following description, the configuration of each table is presented by way of example, and one table may be divided into two or more tables, or all or part of two or more tables may be integrated into one table.

In the following description, a process is described in some cases with a "program" used as the subject. A program is executed by a processor section to carry out a specified process with the aid of a storage section and/or an interface section as appropriate, and the processor section (or device such as controller including processor section) may therefore be the subject of the process.

The program may be installed on an apparatus, such as a computer, or may, for example, be located in a program distribution server or on a computer readable (non-transitory, for example) recording medium. In the following description, two or more programs may be realized as one program, or one program may be realized as two or more programs.

The "processor section" is one or a plurality of processors. The processor is typically a microprocessor, such as a CPU (central processing unit), and may instead be another type of processor, such as a GPU (graphics processing unit). The processor may be a single-core or multi-core processor. The processor may still instead be a processor in a broad sense, such as a hardware circuit that carries out part or entirety of a process (FPGA (field-programmable gate array, for example) or ASIC (application specific integrated circuit)).

In the following description, an identification number is used as identification information on a variety of targets, and identification information on a type other than the identification number (identifier formed of alphabetic character or reference character, for example) may instead be employed. In the following description, "#" represents a number, for example, "xxx #" represents xxx identified by the number.

In the following description, a reference character (or common reference character out of reference characters) is used in the description of elements of the same type that are not distinguished from one another, and in the description of elements of the same type that are distinguished from one another, identification numbers (or reference characters) of the elements are used in some cases. The number of elements of each type shown in the figures is set by way of example and is not limited to the illustrated number.

Example 1

FIG. 1 shows the configuration of a storage system according to an example. In the disclosed system, a plurality of drive boxes 40 are coupled to a storage control apparatus 10, as shown in FIG. 1.

The drive boxes 40 each include one or more drives 41. The drives 41 are each a storage apparatus (storage), such as an HDD (hard disk drive).

The storage control apparatus 10 can communicate with a host apparatus that is not shown, and receives a request from the host apparatus to carry out reading and writing processes on any of the drives 41 in any of the drive boxes 40.

The storage control apparatus 10 includes one or more drives 11, two controllers 20 (controller 20A and controller 20B), and an interface package (IFPK) 30A.

The drives 11 are each a storage apparatus, such as an HDD and an SSD (solid state drive).

The IFPK 30A is a back-end interface section coupled to the drive boxes 40, and the coupling-destination drive 41 is switched from one to another by a PCIe-SW 31A (PCIe stands for peripheral component interconnect-express).

The controller 20A carries out reading and writing processes on the drives 41 in each of the drive boxes 40 via the IFPK 30A.

The controller 20A includes a DIMM 21A as a memory that is a primary storage apparatus, a CPU 22A as an arithmetic processing section, an encryption FPGA (field programmable gate array) 23A as an encryption processing section, and a PCIe-SW 24A.

The encryption FPGA 23A is an apparatus that encrypts and decrypts data. The IFPK 30A provided with the encryption FPGA 23A forms a back-end interface configured to carry out an encryption-related process. The configuration described above, however, consumes a large amount of electric power, resulting in a difficulty in sufficiently cooling the configuration in some cases. Incorporating the encryption FPGA 23A in the controller 20A as shown in FIG. 1 allows suppression of the power consumption and sufficient cooling.

The PCIe-SW 24A is a switch that intervenes in access to the drives 11 and the encryption FPGA 23A in the controller 20.

The DIMM 21A has a cache area and a buffer area. The cache area is an area that temporarily holds data as a target to be read or written, and contributes to an increase in the reading or writing speed. The buffer area is an area used to temporarily hold data in data processing or transfer, and contributes to absorption of a processing or transfer speed difference.

The CPU 22A causes the DIMM 21A to hold data before processing and after processing by the encryption FPGA 23A. As a result, when any of the drives 41 in any of the drive boxes 40 accesses data in the controller 20A, the access destination is limited to the DIMM 21A, whereby occurrence of deadlock can be avoided.

The controller 20B includes a DIMM 21B as a memory that is a primary storage apparatus, a CPU 22B as an arithmetic processing section, an encryption FPGA 23B as an encryption processing section, and a PCIe-SW 24B, as the controller 20A does. An IFPK 30B, which operates in the same manner as the IFPK 30A, may be provided and coupled to the controller 20B.

The storage control apparatus 10, which includes the controllers 20A and 20B, makes the functions thereof redundant.

Figure 2:
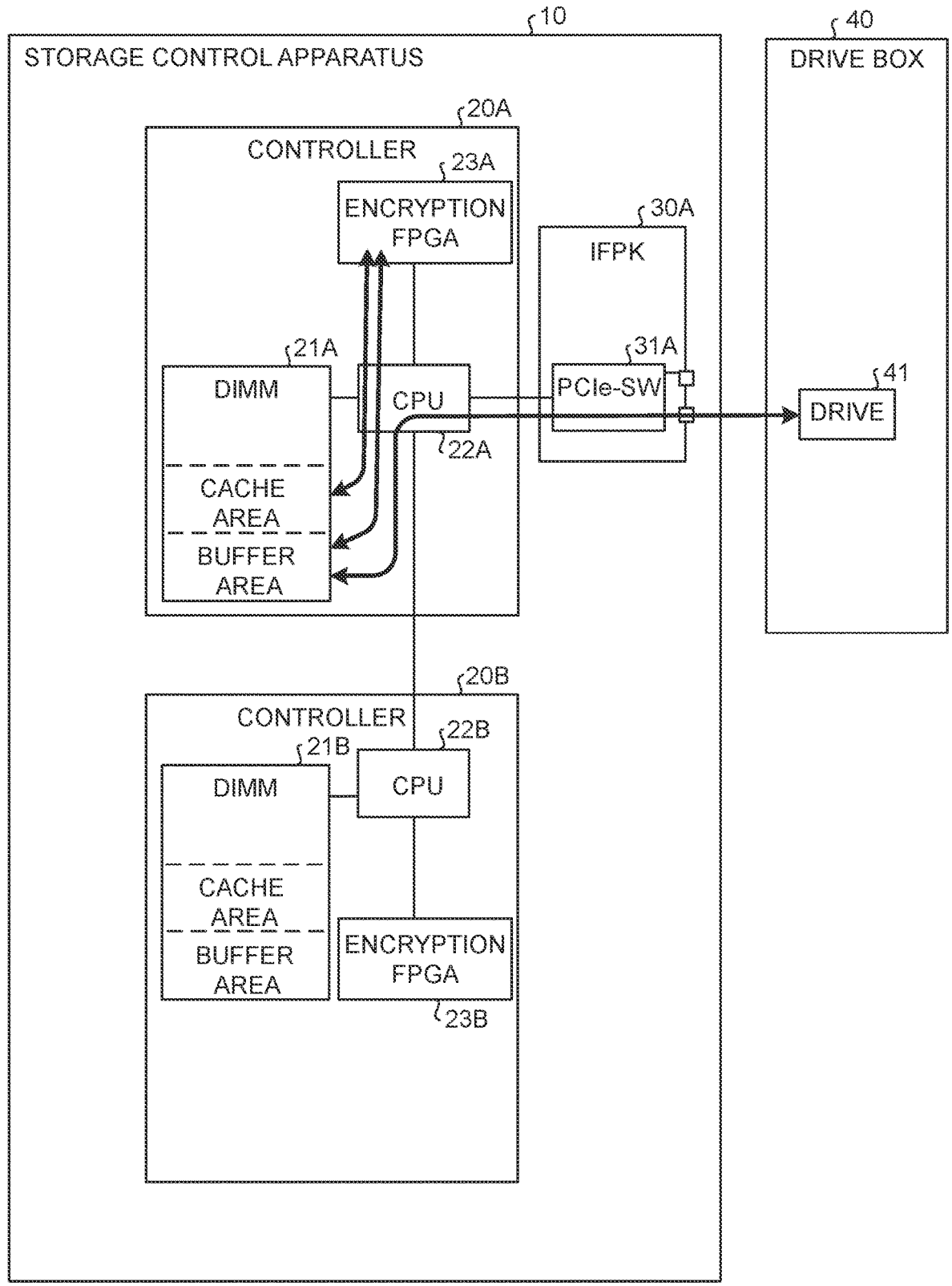
FIG. 2 describes access from a storage (part 1)
Figure 3:
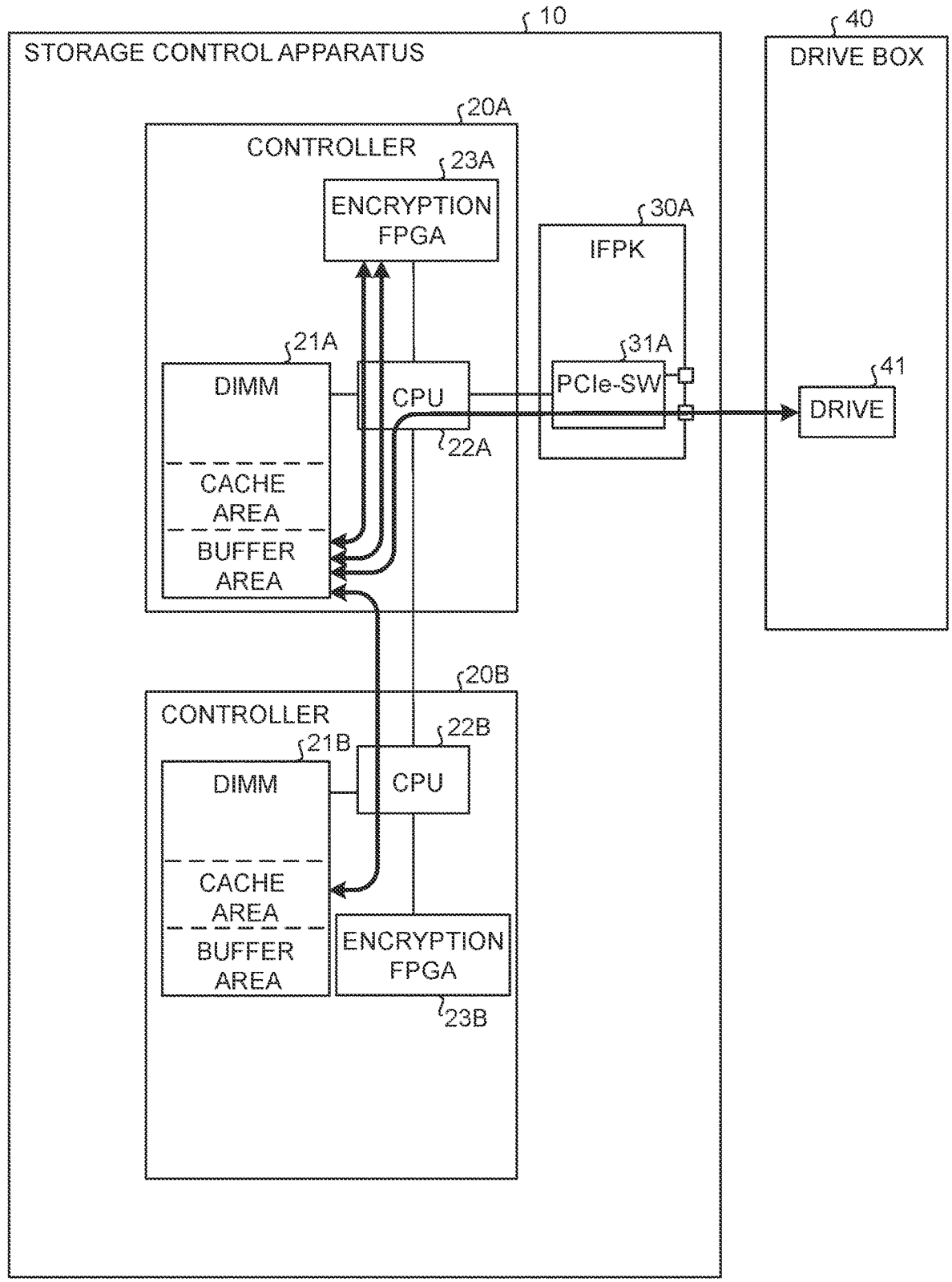
FIG. 3 describes access from the storage (part 2)

FIGS. 2 and 3 describe access from a storage.

When the access from any of the drives 41 is completed in the controller 20A alone, as shown in FIG. 2, the data before and data after processing by the encryption FPGA 23A are held in the cache area and the buffer area of the DIMM 21A, and the drive 41 only access the buffer area of the DIMM 21A.

When access from the drive 41 requires data processing involving the controller 20B beyond the controller 20A, the data is transferred between the cache area of the DIMM 21B of the controller 20B and the buffer area of the DIMM 21A of the controller 20A, as shown in FIG. 3. As a result, the data before and data after processing by the encryption FPGA 23A are held only in the buffer area of the DIMM 21A, and the drive 41 accesses only the buffer area of the DIMM 21A.

To perform the beyond-controller data processing, the data before and data after processing by the encryption FPGA 23A are both written in the buffer area, as shown in FIG. 3.

Figure 4:
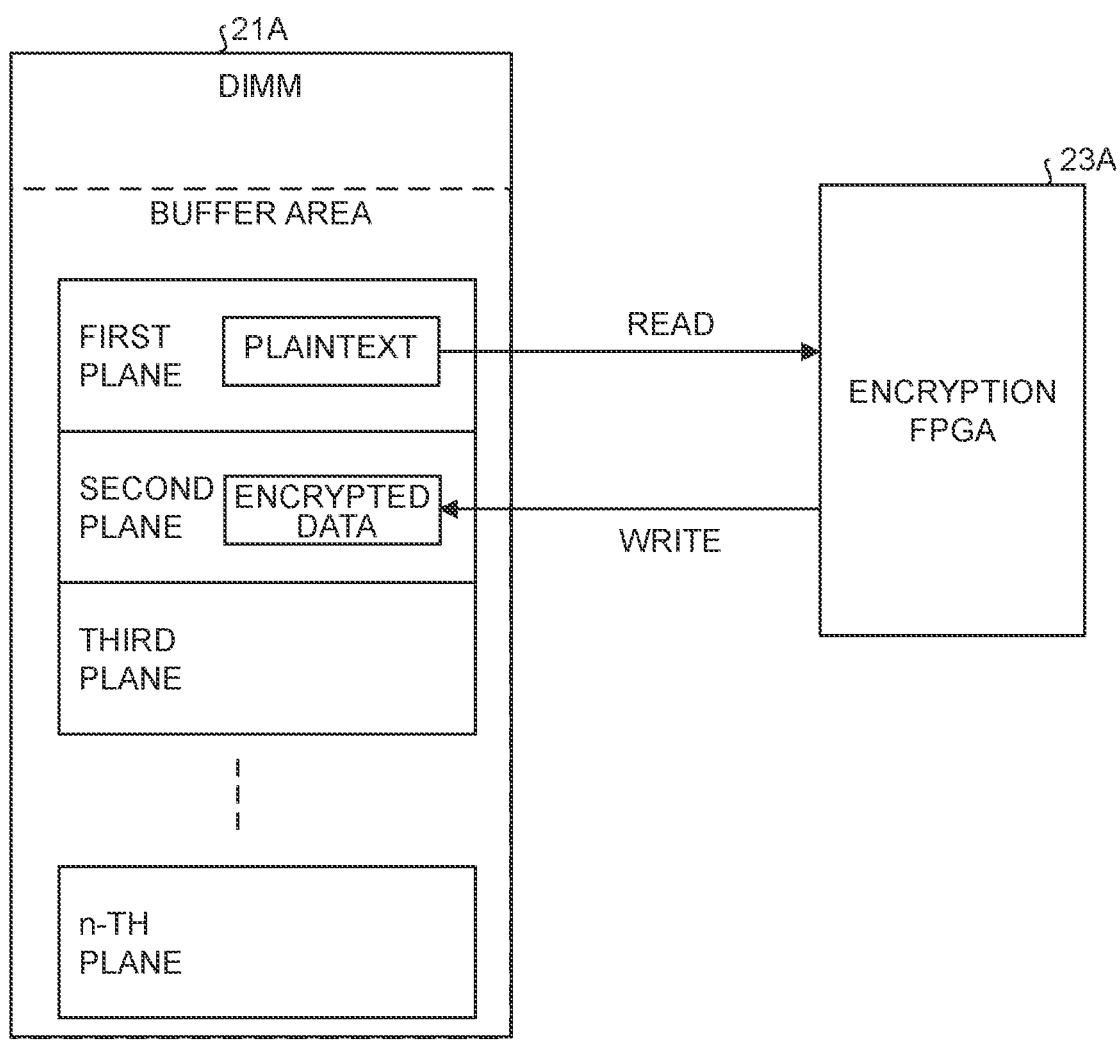
FIG. 4 describes how a buffer area is used (part 1)
Figure 5:
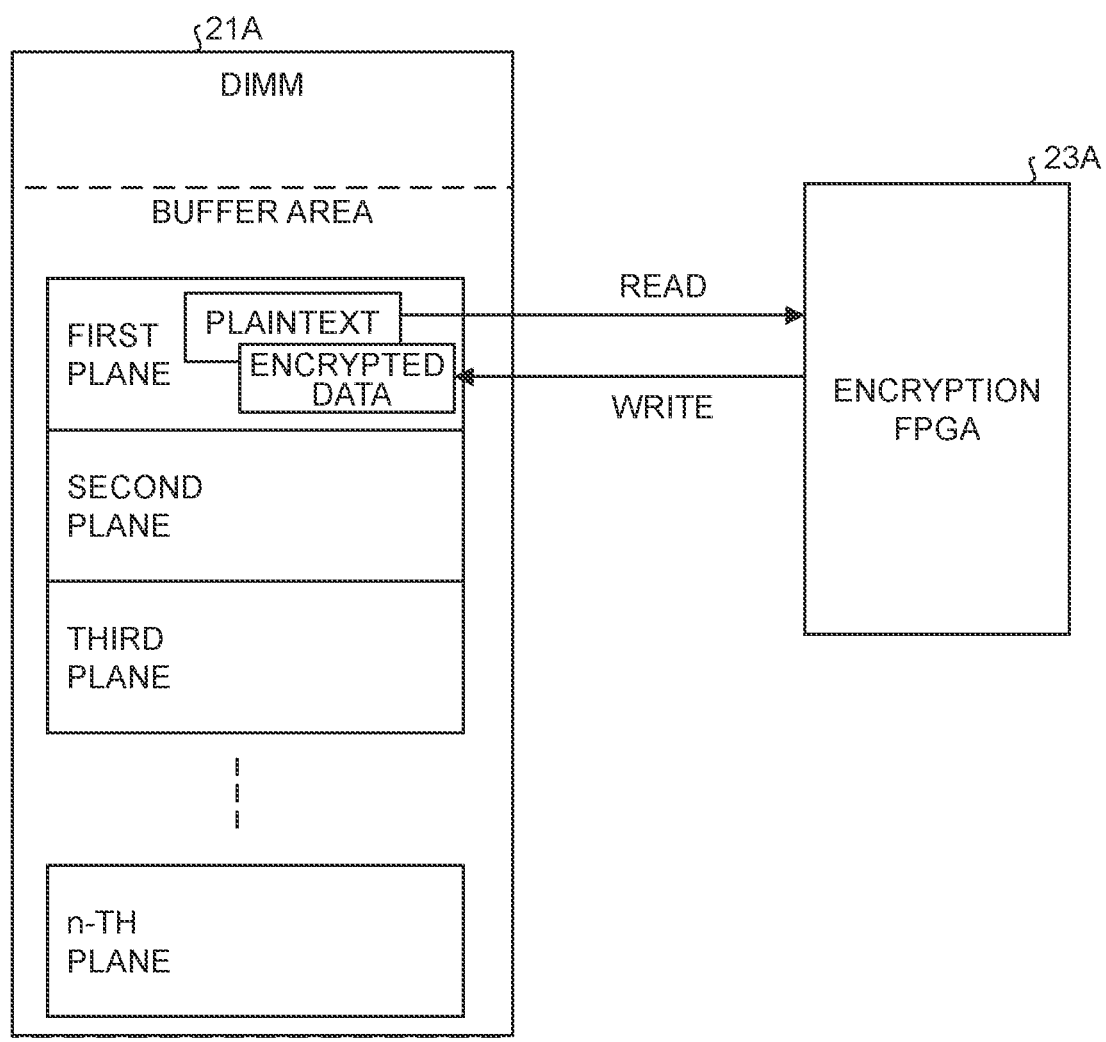
FIG. 5 describes how the buffer area is used (part 2)

FIGS. 4 and 5 describe how the buffer area is used. In FIGS. 4 and 5, the buffer area of the DIMM 21A has a first plane to an n-th plane each capable of holding data.

In FIG. 4, the DIMM 21A holds plaintext data, which is data before processing, in the first plane of the buffer area. The encryption FPGA 23A reads the plaintext data from the first plane, encrypts the data, and writes the encrypted data, which is the data after processing, in the second plane.

When the data before and data after processing by the encryption FPGA 23A are held in different planes of the buffer area as described above, the buffer area needs to have a larger capacity, so that the resources of the DIMM 21 is likely to be exhausted.

In FIG. 5, the encryption FPGA 23A reads the plaintext data from the first plane of the buffer area, encrypts the data, and writes the encrypted data, which is the data after processing, in the first plane. As a result, the data before processing is overwritten by the data after processing and is therefore lost, but the capacity required for the buffer area can be reduced, whereby the exhaustion of the resources of DIMM 21 can be avoided.

The process procedure will be described with reference to FIGS. 6 to 9.

Figure 6:
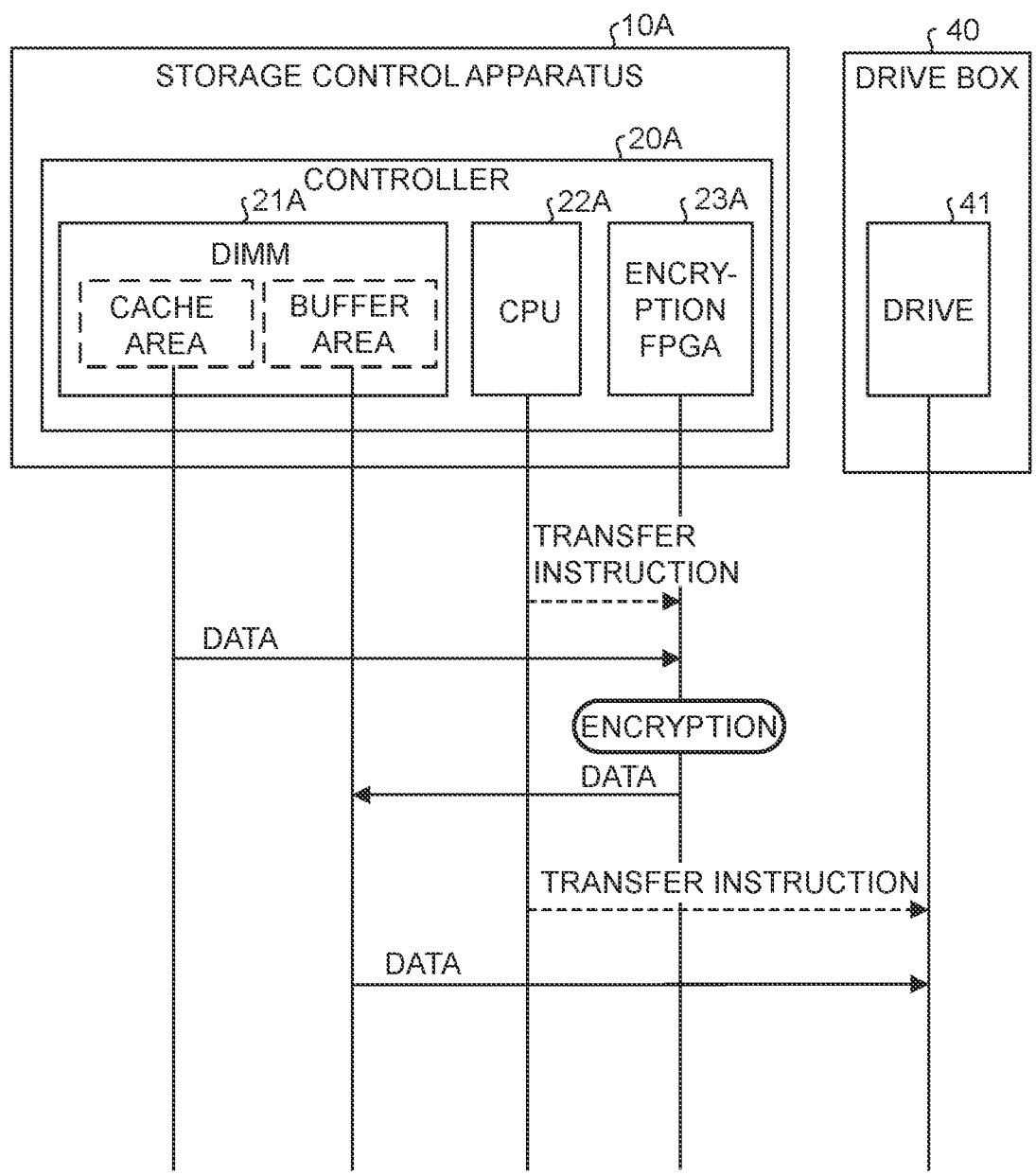
FIG. 6 describes a writing process carried out by a controller alone.

FIG. 6 describes the writing process carried out by a controller alone.

The CPU 22A first issues a transfer instruction to the encryption FPGA 23A. Having received the transfer instruction, the encryption FPGA 23A acquires data from the cache area of the DIMM 21A and encrypts the data. The encryption FPGA 23A stores the encrypted data in the buffer area of the DIMM 21A.

The CPU 22A then issues a transfer instruction to the drive 41. Having received the transfer instruction, the drive 41 accesses the buffer area of the DIMM 21A, acquires the data, and stores the acquired data in the drive 41.

Figure 7:
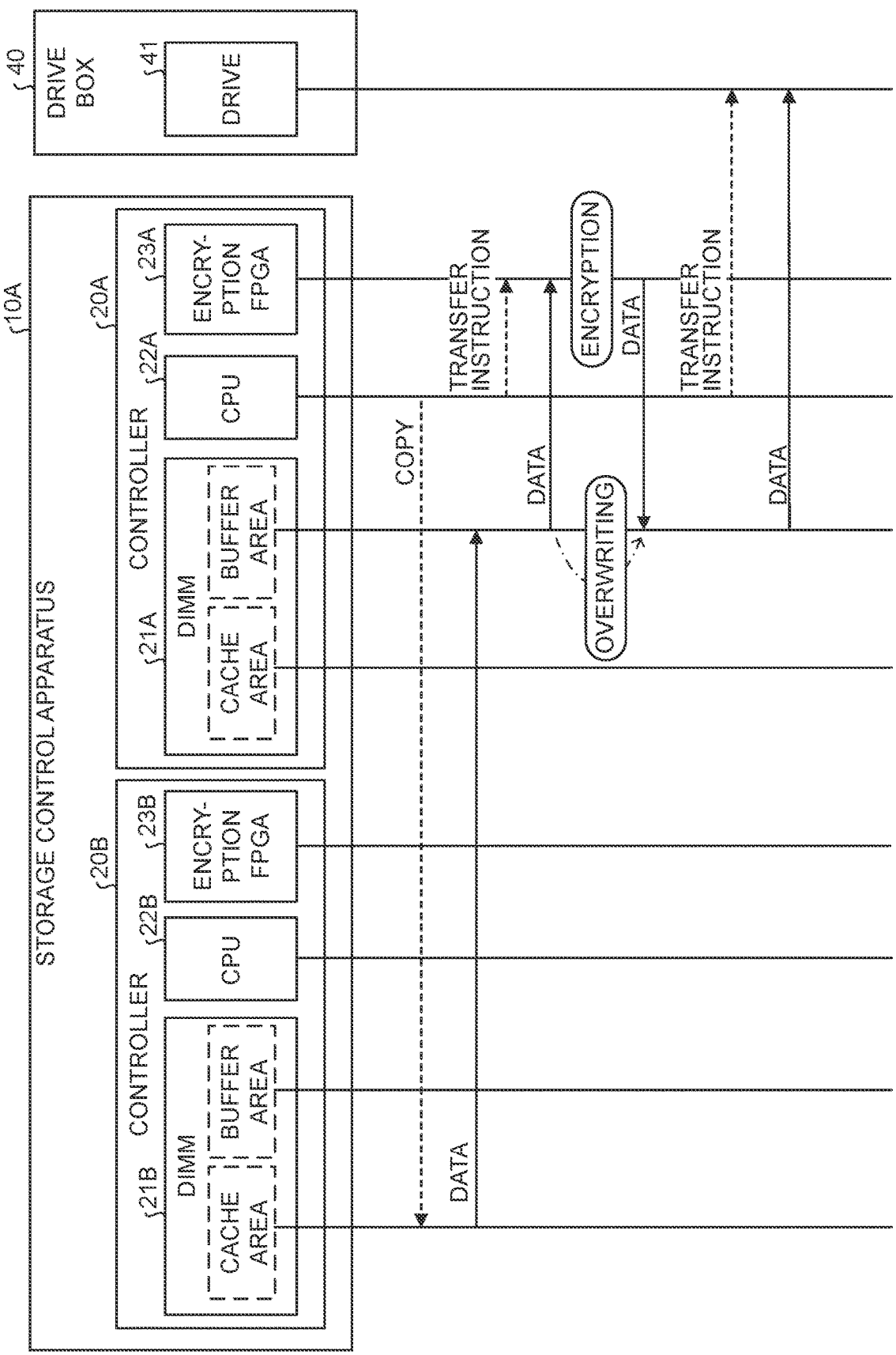
FIG. 7 describes a beyond-controller writing process.

FIG. 7 describes the beyond-controller writing process.

The CPU 22A of the controller A first copies the data from the cache area of the DIMM 21B of the controller 20B to the buffer area of the DIMM 21A of the controller 20A. The CPU 22A then issues a transfer instruction to the encryption FPGA 23A. Having received the transfer instruction, the encryption FPGA 23A acquires the data from the buffer area of the DIMM 21A and encrypts the data. The encryption FPGA 23A stores the encrypted data in the buffer area of the DIMM 21A. As a result, the data before encrypted is overwritten by the data after encrypted.

The CPU 22A then issues the transfer instruction to the drive 41. Having received the transfer instruction, the drive 41 accesses the buffer area of the DIMM 21A, acquires the data, and stores the acquired data in the drive 41.

Even if the data is lost after the overwriting operation, the lost data can be recovered by copying the data from the cache area of the DIMM 21B of the controller 20B again.

Figure 8:
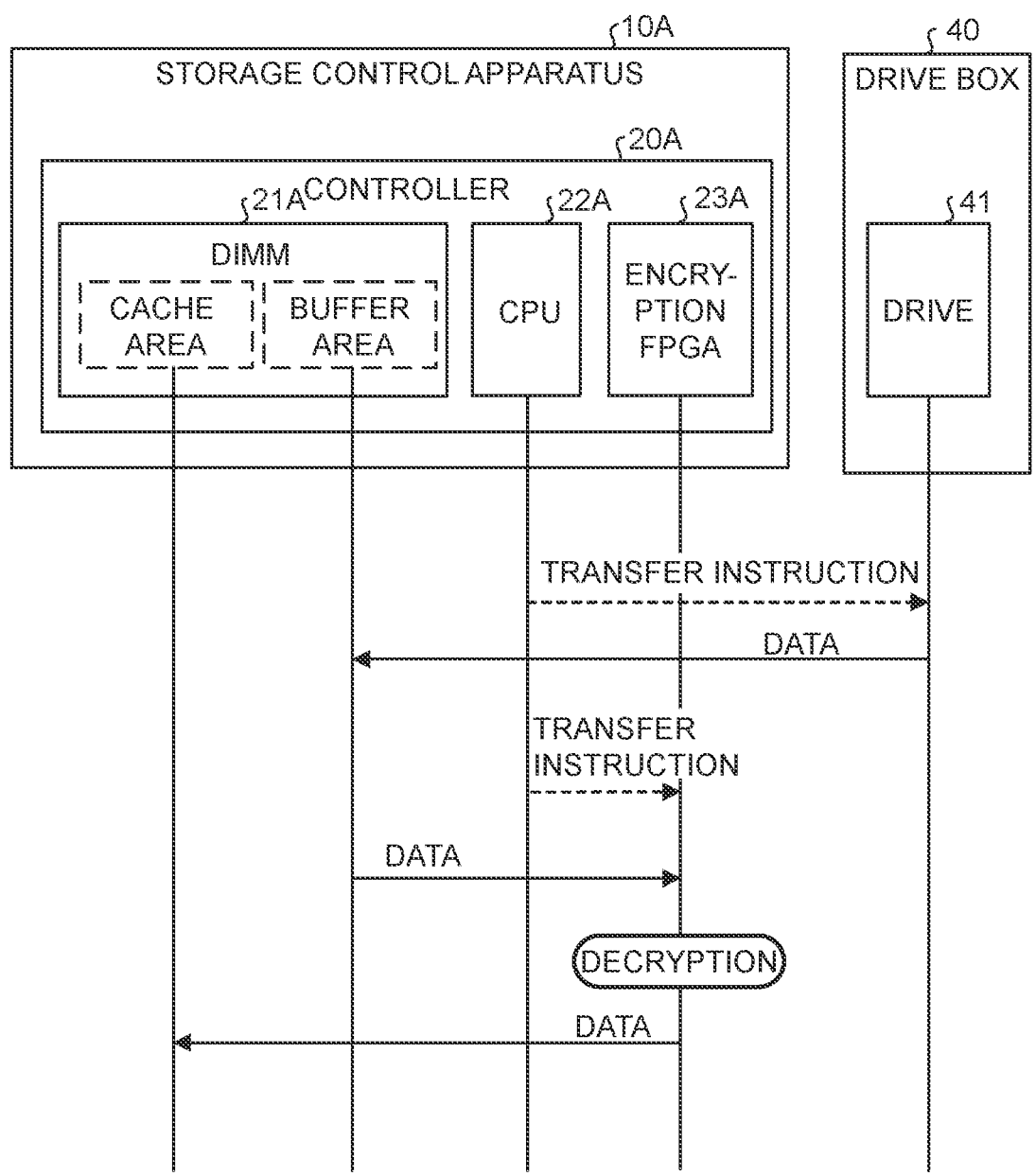
FIG. 8 describes a reading process carried out by a controller alone.

FIG. 8 describes the reading process carried out by a controller alone.

The CPU 22A first issues the transfer instruction to the drive 41. Having received the transfer instruction, the drive 41 accesses the buffer area of the DIMM 21A and stores the data in the drive 41.

The CPU 22A then issues the transfer instruction to the encryption FPGA 23A. Having received the transfer instruction, the encryption FPGA 23A acquires the data from the buffer area of the DIMM 21A and decrypts the data. The encryption FPGA 23A stores the decrypted data in the cache area of the DIMM 21A.

Figure 9:
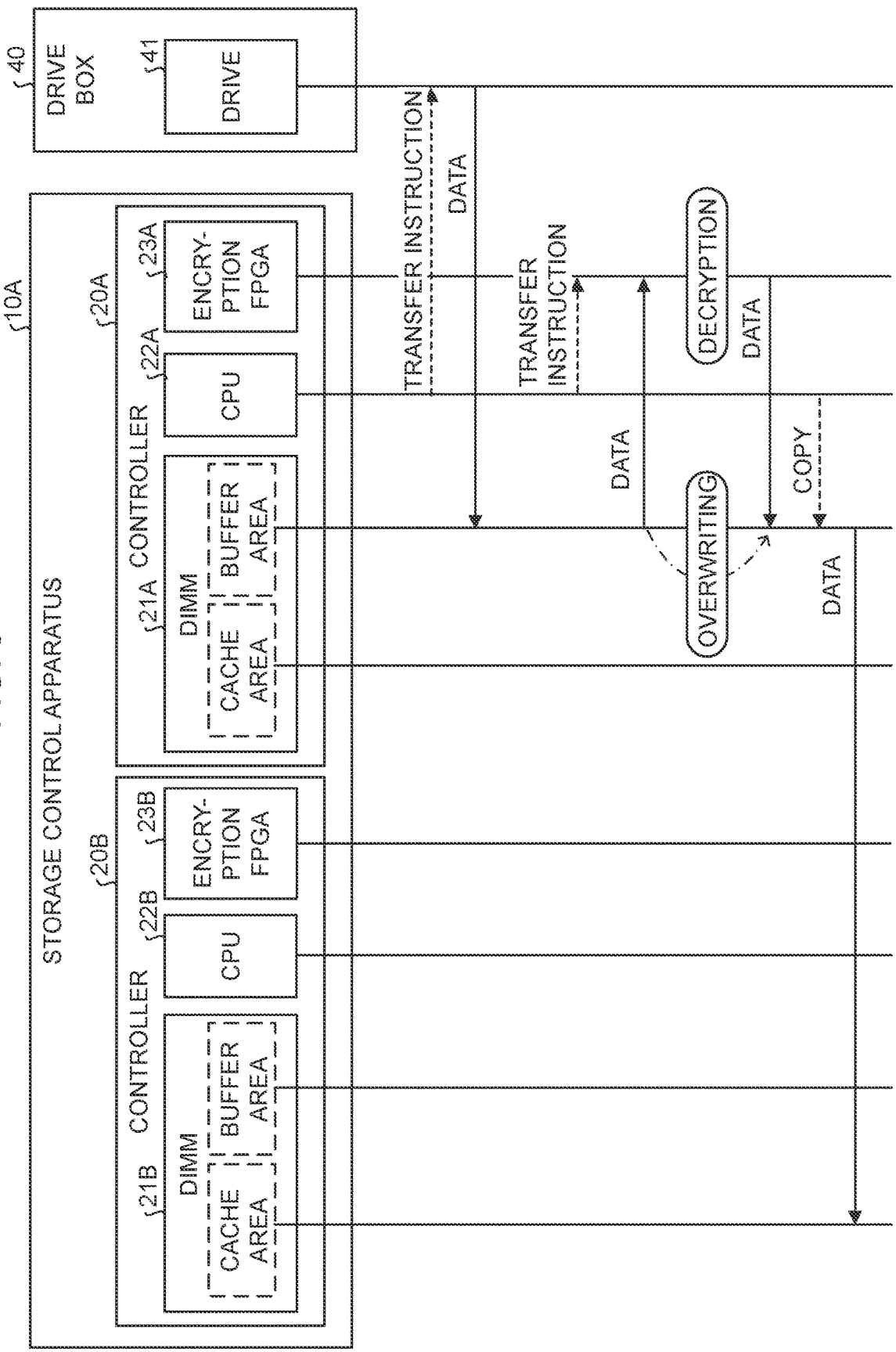
FIG. 9 describes a beyond-controller reading process.

FIG. 9 describes the beyond-controller reading process.

The CPU 22A first issues the transfer instruction to the drive 41. Having received the transfer instruction, the drive 41 accesses the buffer area of the DIMM 21A and stores the data in the drive 41.

The CPU 22A then issues the transfer instruction to the encryption FPGA 23A. Having received the transfer instruction, the encryption FPGA 23A acquires the data from the buffer area of the DIMM 21A and decrypts the data. The encryption FPGA 23A stores the decrypted data in the buffer area of the DIMM 21A. As a result, the data before decrypted is overwritten by the data after decrypted.

The CPU 22A then copies the data from the buffer area of the DIMM 21A of the controller 20A to the cache area of the DIMM 21B of the controller 20B.

Even if the data is lost after the overwriting operation, the lost data can be recovered by issuing the transfer instruction to the drive 41 again.

Figure 10:
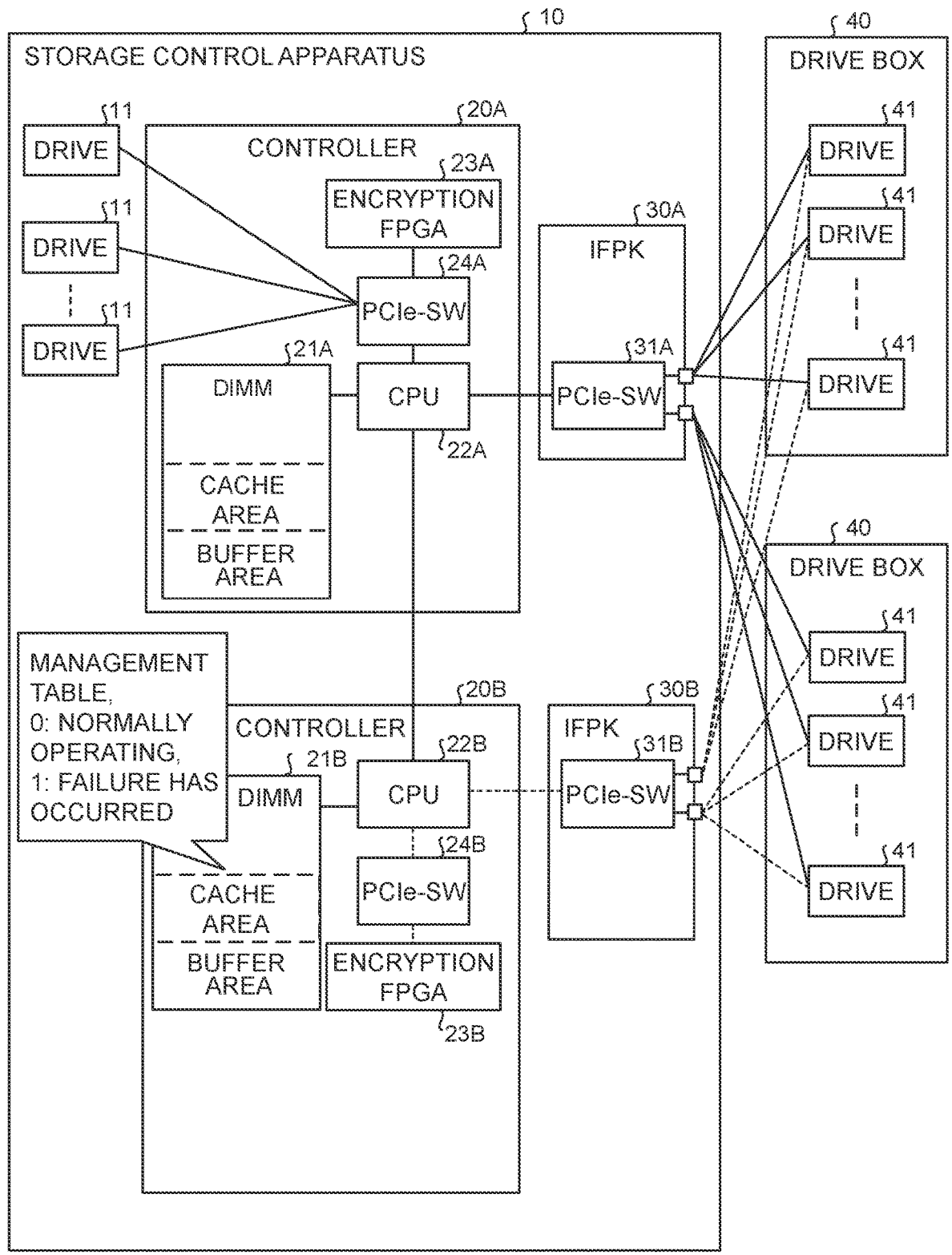
FIG. 10 describes actions performed when failure occurs.

FIG. 10 describes actions performed when failure occurs. In FIG. 10, the controller 20A is coupled to all the drive boxes 40 via IFPK 30A, and the controller 20B is coupled to all the drive boxes 40 via IFPK 30B. The DIMM 21A and DIMM 21B each hold a management table and manage whether or not failure has occurred.

If failure occurs in the PCIe-SW 24B or the encryption FPGA 23B of the controller 20B, a flag indicating the occurrence of failure is set in the management table, and access to the drive boxes 40 via the IFPK 30B is blocked. When access to the drive boxes 40 is required, an access path via the controller 20A is used. That is, the writing process is carried out in accordance with the processes shown in FIG. 7, and the reading process is carried out in accordance with the processes shown in FIG. 9.

As a variation, one controller may be configured to include a plurality of sets of DIMMs, CPUs, PCIe-SWs, and encryption FPGAs. In this case, when a plurality of ports of the IFPK are associated with the plurality of sets, closing the port corresponding to the set having experienced failure allows the access blockage range to be readily controlled.

Figure 11:
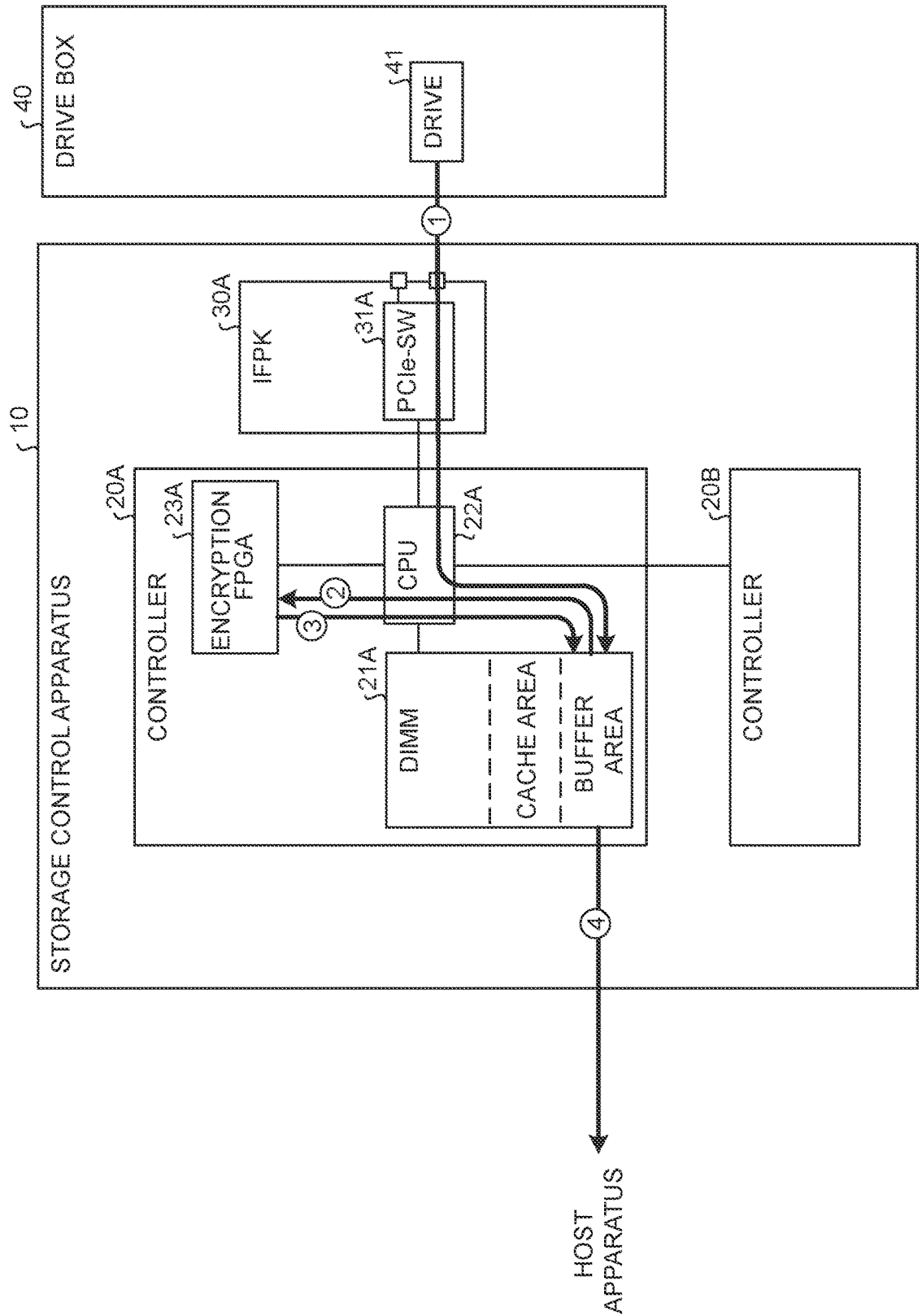
FIG. 11 describes a reading process carried out by a host apparatus.

FIG. 11 describes a reading process carried out by the host apparatus. In the reading process carried out by the host apparatus, any of the drives 41 first stores data in the buffer area of the DIMM 21A (1). The encryption FPGA 23A acquires the data from the buffer area of the DIMM 21A (2), and stores the decrypted data in the buffer area of DIMM 21A (3). As a result, the data before decrypted is overwritten by the data after decrypted.

The host apparatus then reads the data from the buffer area of DIMM 21A of the controller 20A (4).

Even if the data is lost after the overwriting operation, the lost data can be recovered by acquiring the data from the drive 41 again.

Figure 12:
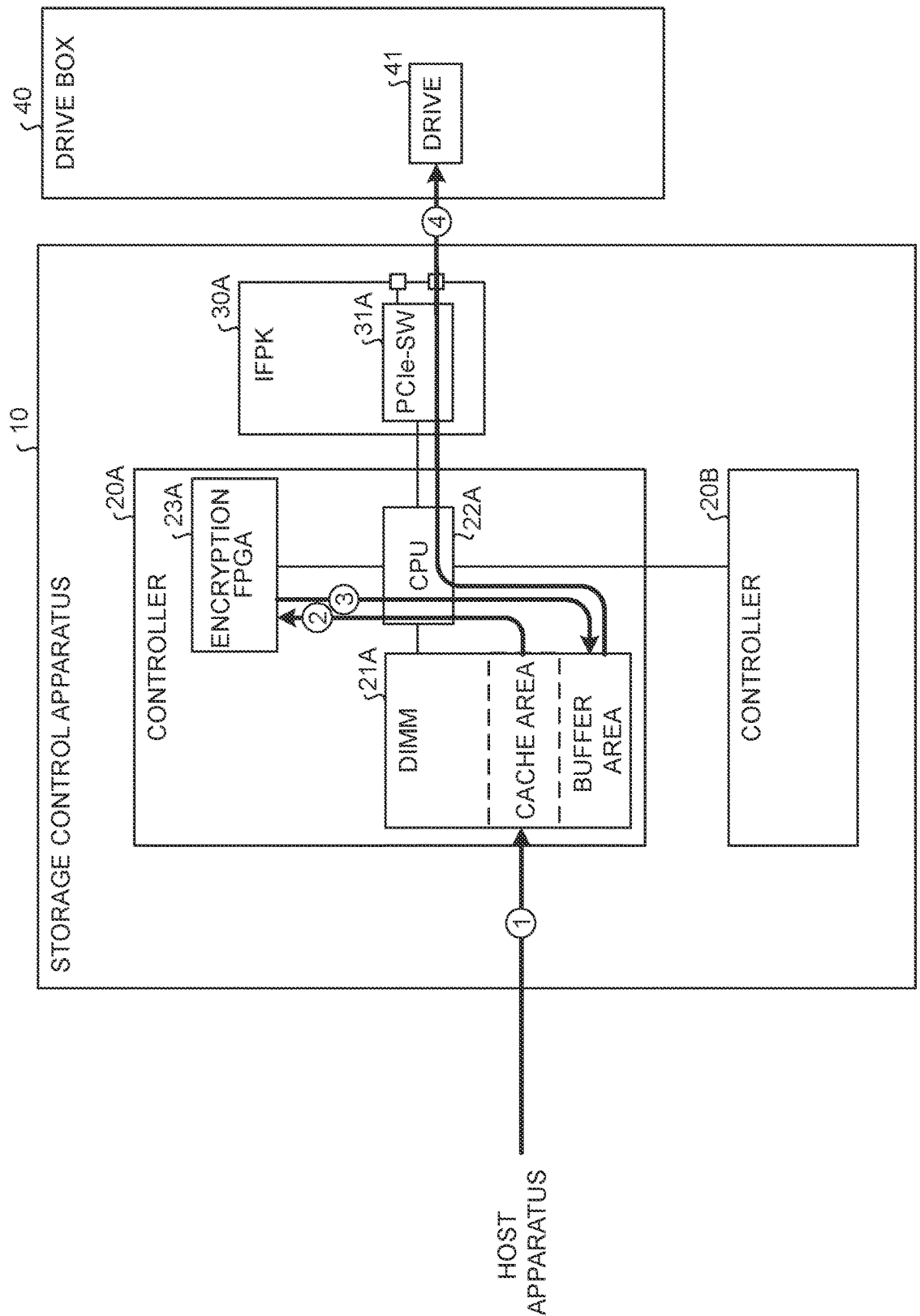
FIG. 12 describes a writing process carried out by the host apparatus.

FIG. 12 describes a writing process carried out by the host apparatus. In the writing process carried out by the host apparatus, data to be written received from the host apparatus is first stored in the cache area of the DIMM 21A of the controller 20A (1).

The encryption FPGA 23A acquires the data from the cache area of DIMM 21A (2) and stores the encrypted data in the buffer area of DIMM 21A (3). The drive 41 accesses the buffer area of the DIMM 21A to acquire the data (4), and stores the acquired data in the drive 41.

The data is not overwritten in the writing process carried out by the host apparatus, as described above, unlike the reading process carried out by the host apparatus.

As described above, the disclosed storage system includes an interface section coupled to one or more storages, and a controller that carries out reading and writing processes on the storages via the interface section. The controller includes an arithmetic processing section, a memory, and an encryption processing section. The arithmetic processing section causes the memory to hold data before processing and data after processing by the encryption processing section, and limits the access destination from the storages to the memory.

A storage system that avoids occurrence of deadlock and allows the controller to have an encryption-related function can therefore be provided.

Furthermore, the disclosed storage system, when causing the memory to hold the data after processing, overwrites the data before processing with the data after processing.

Specifically, the memory is provided with a cache area and a buffer area, and when the arithmetic processing section causes the encryption processing section to process the data before processing that is held in the buffer area, the arithmetic processing section overwrites the data before processing with the data after processing.

The arithmetic processing section causes the buffer area to hold data acquired from another controller, and when the arithmetic processing section causes the encryption processing section to process the data as the data before processing, the arithmetic processing section overwrites the data before processing with the data after processing.

The arithmetic processing section causes the buffer area to hold data read from any of the storages, and when the arithmetic processing section causes the encryption processing section to process the data as the data before processing, the arithmetic processing section overwrites the data before processing with the data after processing.

A storage system that overwrites data to suppress the capacity of the memory and allows the controller to have an encryption-related function can therefore be provided.

The present invention is not limited to the example described above and includes a variety of variations. For example, the aforementioned example has been described in detail to describe the present invention in an easy-to-understand manner, and does not necessarily include all the configurations described above. Any of the configurations can be deleted or replaced, and any configuration can be added.

REFERENCE SIGNS LIST

10: Storage control apparatus, 11: Drive, 20: Controller, 21A, 21B: DIMM, 22A, 22B: CPU, 23A, 23B: Encryption FPGA, 30A, 30B: IFPK, 40: Drive box, 41: Drive

What is claimed is:

1. A storage system comprising:
an interface section coupled to one or more storages; and
a controller that carries out reading and writing processes on the storages via the interface section,
wherein the controller includes:
    a central processing unit (CPU);
    a memory coupled to the CPU, the memory having a buffer area and a cache area; and
    an encryption processor,
wherein the CPU is configured to:
    cause the memory to hold plaintext data and encrypted data encrypted by the encryption processor, and
    limit an access destination of each of the storages to only the buffer area of the memory, and
    issue a transfer instruction to the encryption processor,
wherein the encryption processor is configured to:
    in response to receiving the transfer instruction from the CPU, acquire the plaintext data from the buffer area of the memory, encrypt the data to generate encrypted data of the plaintext data, and overwrite the plaintext data in the buffer area with the encrypted data.

2. The storage system according to claim 1,
wherein the controller includes a plurality of controllers including a first controller and a second controller, each having a memory, a CPU, and an encryption processor, and
wherein the processor of the first controller is configured to:
cause a buffer area of the first controller to hold data acquired from the second controller.

3. The storage system according to claim 1,
wherein the CPU is configured to cause the buffer area to hold the encrypted data read from any of the storages, and
wherein the encryption processor is configured to acquire the encrypted data from the buffer area, decrypt the encrypted data to generate decrypted data, and overwrite the encrypted data in the buffer area with the decrypted data.

4. A data processing method executed by a controller coupled to a storage via an interface section, the method comprising:
storing, by a CPU provided in the controller plaintext data in a buffer area of a memory;
limiting an access destination of each of a plurality of storages to only the buffer area of the memory;
issuing a transfer instruction to an encryption processor;
in response to receiving the transfer instruction from the CPU, acquiring, by the encryption processor, the plaintext data from the buffer area of the memory, encrypting the data to generate encrypted data of the plaintext data, and overwriting the plaintext data in the buffer with the encrypted data.

* * * * *